US011789764B2

(12) United States Patent
Vidyadhara et al.

(10) Patent No.: US 11,789,764 B2
(45) Date of Patent: Oct. 17, 2023

(54) SYSTEMS AND METHODS FOR MULTI-LINK PLATFORM CONFIGURATION WITH CONTAINERIZED COMPUTE INSTANCES

(71) Applicant: Dell Products L.P., Round Rock, TX (US)

(72) Inventors: Sumanth Vidyadhara, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 480 days.

(21) Appl. No.: 16/984,753

(22) Filed: Aug. 4, 2020

(65) Prior Publication Data
US 2022/0043665 A1    Feb. 10, 2022

(51) Int. Cl.
*G06F 9/455*    (2018.01)
(52) U.S. Cl.
CPC ........... *G06F 9/45558* (2013.01); *G06F 2009/45579* (2013.01); *G06F 2009/45595* (2013.01)
(58) Field of Classification Search
None
See application file for complete search history.

(56) References Cited

U.S. PATENT DOCUMENTS

| 10,333,985 | B2 * | 6/2019 | Pulapaka | H04L 63/10 |
|---|---|---|---|---|
| 11,334,364 | B2 * | 5/2022 | Rietschin | G06F 16/188 |
| 11,342,987 | B2 * | 5/2022 | Metzger | H04W 76/25 |
| 2020/0304599 | A1 * | 9/2020 | Kanso | G06F 8/36 |

* cited by examiner

*Primary Examiner* — Lewis A Bullock, Jr.
*Assistant Examiner* — Melissa A Headly
(74) *Attorney, Agent, or Firm* — Jackson Walker L.L.P

(57) ABSTRACT

An information handling system may include a processor subsystem and non-transitory computer-readable media communicatively coupled to the processor subsystem and storing instructions, the instructions configured to, when read and executed by the processor subsystem: execute a basic/input output service to create a link aggregation table with details based on wireless and wired network interface modules present within the information handling system; execute a first operating system service on a container instantiated on a hypervisor of the information handling system to instantiate virtual link aggregation tables for the container based on a network bandwidth policy of the container and link aggregation capabilities as set forth in the link aggregation table; and execute a second operating system service on the hypervisor to instantiate an operating system driver based on operating systems for network instances of link aggregation drivers and dynamic detection of network driver requirements determined by the first operating system service.

15 Claims, 3 Drawing Sheets

SYSTEMS AND METHODS FOR MULTI-LINK PLATFORM CONFIGURATION WITH CONTAINERIZED COMPUTE INSTANCES

TECHNICAL FIELD

This disclosure relates generally to virtualized information handling systems and more particularly to systems and methods for multi-link platform configuration with container instances in an information handling system environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

A trend in computing is that a user's "context" (data, workspace, etc.) moves with the user and is largely physical device-agnostic. However, using existing approaches, virtual machines or other containers have no architecture to support communication with multiple links. When a physical information handling system has a plurality of containers instantiated thereon, with each container needing to communicate with multiple links present on the information handling system, existing approaches do not provide for scalable platform configuration at initialization of the container based on dynamic network driver requirements for each container.

SUMMARY

In accordance with the teachings of the present disclosure, the disadvantages and problems associated with existing approaches to network configuration in a multi-link platform having a plurality of containers may be reduced or eliminated.

In accordance with embodiments of the present disclosure, an information handling system may include a processor subsystem and non-transitory computer-readable media communicatively coupled to the processor subsystem and storing instructions, the instructions configured to, when read and executed by the processor subsystem: execute a basic/input output service to create a link aggregation table with details based on wireless and wired network interface modules present within the information handling system; execute a first operating system service on a container instantiated on a hypervisor of the information handling system to instantiate virtual link aggregation tables for the container based on a network bandwidth policy of the container and link aggregation capabilities as set forth in the link aggregation table; and execute a second operating system service on the hypervisor to instantiate an operating system driver based on operating systems for network instances of link aggregation drivers and dynamic detection of network driver requirements determined by the first operating system service.

In accordance with these and other embodiments of the present disclosure, a method may include executing a basic/input output service to create a link aggregation table with details based on wireless and wired network interface modules present within an information handling system, executing a first operating system service on a container instantiated on a hypervisor of the information handling system to instantiate virtual link aggregation tables for the container based on a network bandwidth policy of the container and link aggregation capabilities as set forth in the link aggregation table, and executing a second operating system service on the hypervisor to instantiate an operating system driver based on operating systems for network instances of link aggregation drivers and dynamic detection of network driver requirements determined by the first operating system service.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: execute a basic/input output service to create a link aggregation table with details based on wireless and wired network interface modules present within an information handling system; execute a first operating system service on a container instantiated on a hypervisor of the information handling system to instantiate virtual link aggregation tables for the container based on a network bandwidth policy of the container and link aggregation capabilities as set forth in the link aggregation table; and execute a second operating system service on the hypervisor to instantiate an operating system driver based on operating systems for network instances of link aggregation drivers and dynamic detection of network driver requirements determined by the first operating system service.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
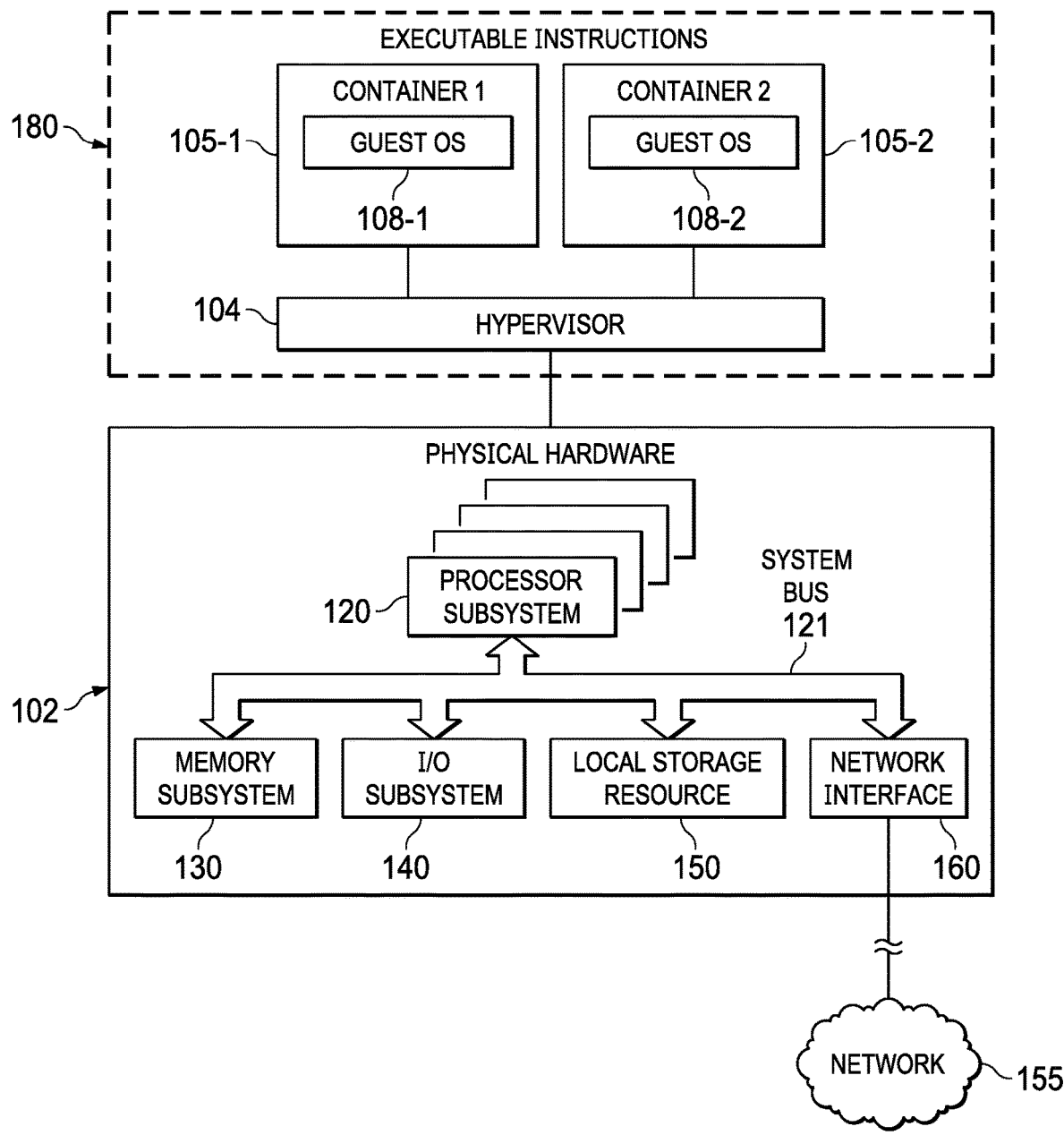
FIG. 1 illustrates a block diagram of selected elements of an example information handling system having a plurality of containers instantiated thereon, in accordance with embodiments of the present disclosure.
Figure 2:
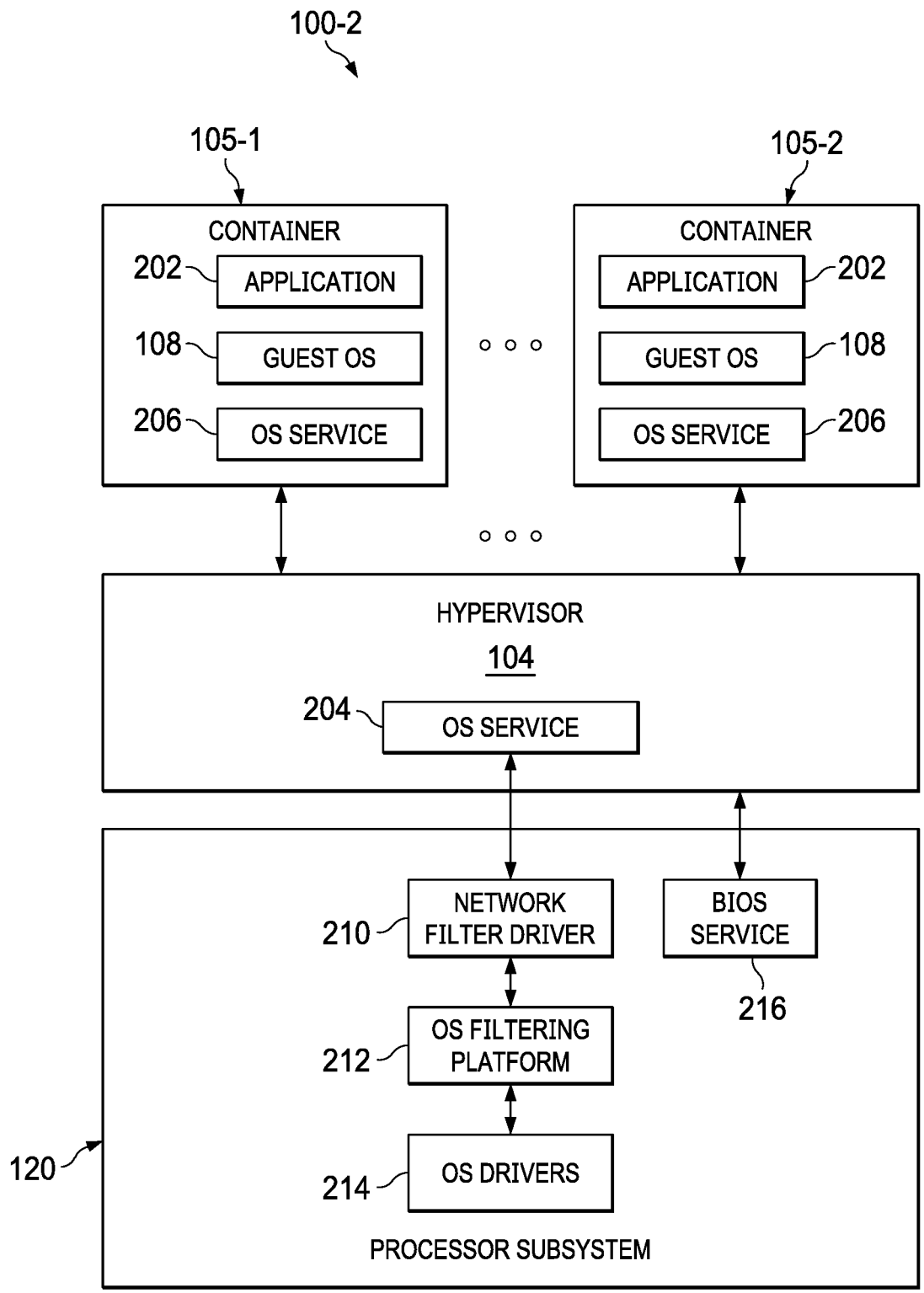
FIG. 2 illustrates a block diagram of selected elements of an example information handling system configured to perform multi-link platform configuration with containerized compute instances, in accordance with embodiments of the present disclosure.
Figure 3:
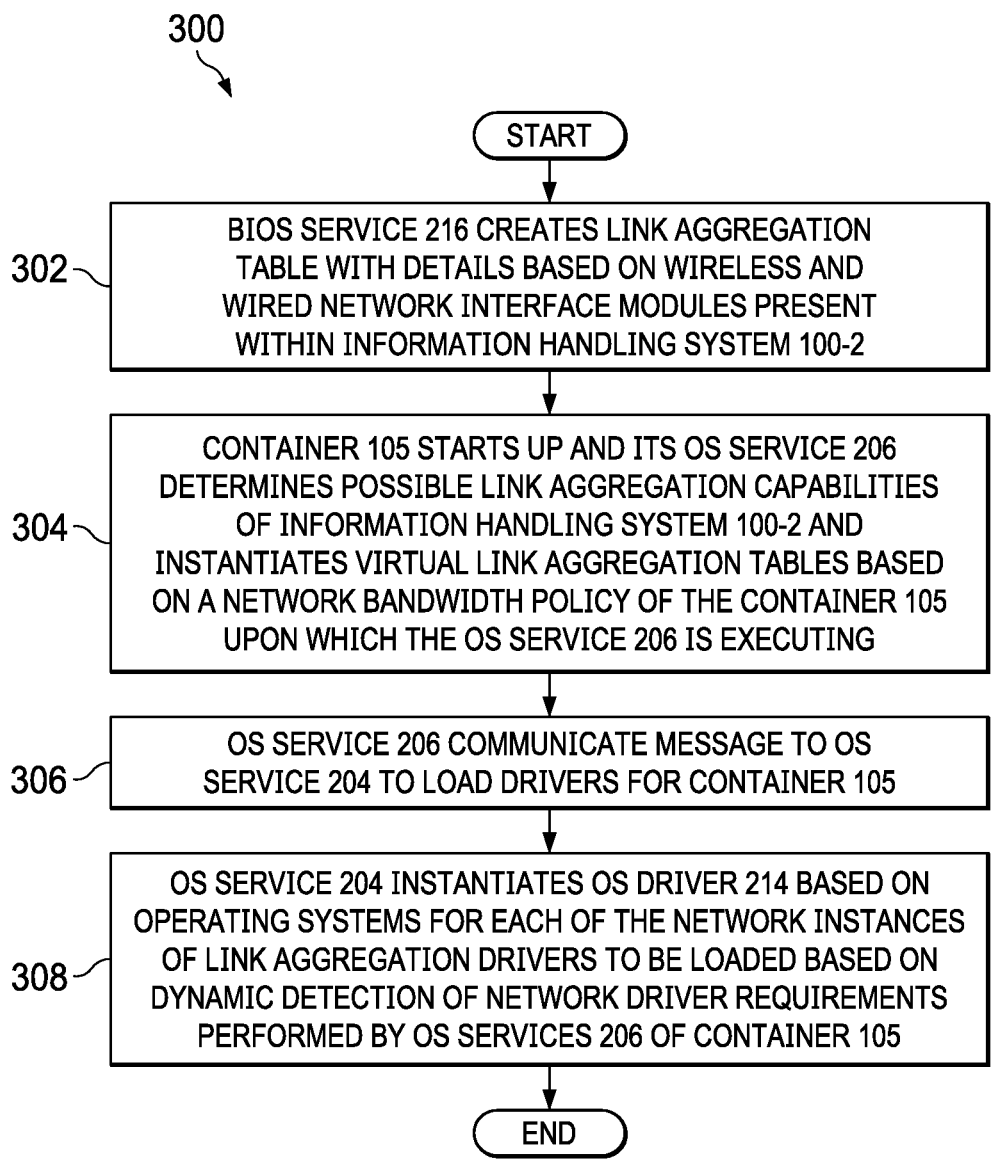
FIG. 3 illustrates a flow chart of an example method for multi-link platform configuration with containerized compute instances, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

Referring now to the drawings, FIG. 1 illustrates a block diagram of selected elements of an example information handling system 100-1 having a plurality of containers 105 instantiated thereon, in accordance with embodiments of the present disclosure. As depicted in FIG. 1, system 100-1 may represent an information handling system comprising physical hardware 102, and executable instructions 180 (including hypervisor 104 and one or more containers 105). System 100-1 may also include external or remote elements, for example, network 155.

As shown in FIG. 1, components of physical hardware 102 may include, but are not limited to, processor subsystem 120, which may comprise one or more processors, and system bus 121 that may communicatively couple various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

Network interface 160 may comprise any suitable system, apparatus, or device operable to serve as an interface between information handling system 100-1 and network 155. Network interface 160 may enable information handling system 100-1 to communicate over network 155 using a suitable transmission protocol or standard, including, but not limited to, transmission protocols or standards enumerated below with respect to the discussion of network 155. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in a network storage resource coupled via network 155). In particular, processor subsystem 120 may represent a multi-processor configuration that includes at least a first processor and a second processor (see also FIG. 2).

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as system 100-1, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. In system 100-1, I/O subsystem 140 may comprise any suitable system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS.

Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the container may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, container 1 105-1 may represent a host for guest OS 108-1, while container 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of containers 105. In other words, hypervisor 104 may assign to each of containers 105, for example, one or more processors from processor subsystem 120, one or more regions of memory in memory subsystem 130, one or more components of I/O subsystem 140, etc. In some embodiments, the virtualized hardware representation presented to each of containers 105 may comprise a mutually exclusive (i.e., disjointed or non-overlapping) set of hardware resources per container 105 (e.g., no hardware resources are shared between containers 105). In other embodiments, the virtualized hardware representation may comprise an overlapping set of hardware resources per container 105 (e.g., one or more hardware resources are shared by two or more virtual machines 105).

As used herein, "container" may generally refer to any instance of a virtualized information handling system, whether a virtual machine, a software application container, a hardware-rooted, secure container, etc.

In some embodiments, hypervisor 104 may assign hardware resources of physical hardware 102 statically, such that certain hardware resources are assigned to certain containers, and this assignment does not vary over time. Additionally or alternatively, hypervisor 104 may assign hardware resources of physical hardware 102 dynamically, such that the assignment of hardware resources to containers varies over time, for example, in accordance with the specific needs of the applications running on the individual container. Additionally or alternatively, hypervisor 104 may keep track of the hardware-resource-to-container mapping, such that hypervisor 104 is able to determine the virtual machines to which a given hardware resource of physical hardware 102 has been assigned.

In FIG. 1, each of containers 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another container (not shown) may comprise a VXWORKS OS. Although system 100-1 is depicted as having two virtual containers 105-1, 105-2, it will be understood that, in particular embodiments, different numbers of containers 105 may be executing on system 100-1 at any given time.

In operation of system 100-1 shown in FIG. 1, hypervisor 104 of information handling system 100-1 may virtualize the hardware resources of physical hardware 102 and present virtualized computer hardware representations to each of containers 105. Each guest OS 108 of containers 105 may then begin to operate and run applications and/or other software. While operating, each guest OS 108 may utilize one or more hardware resources of physical hardware 102 assigned to the respective container 105 by hypervisor 104.

FIG. 2 illustrates a block diagram of selected elements of an example information handling system 100-2 configured to perform multi-link platform configuration with containerized compute instances (e.g., containers 105), in accordance with embodiments of the present disclosure. In FIG. 2, certain elements shown in system 100-1 have been omitted from FIG. 2 for descriptive clarity. Further, only two instances of containers 105 and guest OSes 108 are shown in FIG. 2, though they may represent any number of instances of containers 105 and guest OSes 108.

In the kernel space, processor subsystem 120 may execute network filter driver 210, OS filtering platform 212, OS drivers 214, and BIOS service 216.

Network filter driver 210 may comprise any suitable filter driver configured to enable multilink communication in information handling system 100-2. Such network filter drivers are well known in the art, and thus, detailed description of network filter driver 210 is beyond the scope of this disclosure.

OS filtering platform 212 may comprise any system, device, or apparatus configured to enable applications to tie into packet processing and a filtering pipeline of a network stack. OS filtering platform 212 may provide features such as integrated communication, and an administrator of information handling system 100-2 may configure OS filtering platform 212 to invoke processing logic on a per-application basis. In some embodiments, OS filtering platform 212 may be implemented using Windows Filtering Platform.

OS drivers 214 may comprise any system, device, or apparatus configured to provide a programming interface between hypervisor 204 and a network interface 160. In some embodiments, OS drivers 214 may be implemented in accordance with Windows Driver Model. Such OS drivers are well known in the art, and thus, detailed description of OS drivers 214 is beyond the scope of this disclosure.

Basic input/output system (BIOS) service 216 may be implemented in a BIOS of information handling system 100-2. At boot or other initiation of information handling system 100-2, BIOS service 216 may create a link aggregation table (e.g., an Advanced Configuration and Power Interface (ACPI) table) with details based on wireless and wired network interface modules present within information handling system 100-2. Creation of details of the link aggregation table may be based on a configuration of the platform of information handling system 100-2 and capabilities of network interface cards present within information handling system 100-2. For example, if information handling system 100-2 included a 1 gigabit-per-second Wireless Fidelity (Wi-Fi) card with identifier WIFI1, a 100 megabit-per-second Wi-Fi card with identifier WIFI2, and a 1 gigabit-per-second wired card with identifier WIRED, BIOS service 216 may create link aggregation table details as follows:

ACPI table of WIFI1_WIFI2 WIRED Module 1
ACPI table of WIFI1_WIFI2 Module 2
ACPI table of WIFI1_WIRED Module 3
ACPI table of WIFI2_WIRED Module 4

As shown in FIG. 2, a container 105 may execute application 202 and guest OS 108. Typically, applications 202 executing on a container 105 would execute the same instructions as they would if executing on a non-virtualized operating system. Also as shown in FIG. 2, each container 105 may have an OS service 206 that may be configured to determine the possible link aggregation capabilities of information handling system 100-2 and instantiate virtual link aggregation tables (e.g., ACPI tables) based on a network bandwidth policy of the container 105 upon which the OS service 206 is executing.

As shown in FIG. 2, hypervisor 104 may implement its own OS service 204. OS service 204 may in some embodiments be implemented using a modified Dell Smartbyte service. In operation, OS service 204 may be configured to instantiate an OS driver 214 (e.g., a Linux driver, a Windows Driver Model driver, or other suitable driver) based on operating systems for each of the network instances of link aggregation drivers to be loaded based on dynamic detection of network driver requirements performed by OS services 206 of containers 105. For example, each of containers 105 may use instances created by the link aggregation table (created by BIOS service 216, as described above) based on a platform policy in a core OS of hypervisor 104. The core OS of hypervisor 104 may then use specific link aggregation drivers based on platform-level (e.g., at the level of information handling system 100-2) aggregation of network modules present in the link aggregation table.

FIG. 3 illustrates a flow chart of an example method 300 for multi-link platform configuration with containerized compute instances, in accordance with embodiments of the present disclosure. According to some embodiments, method 300 may begin at step 302. As noted above, teachings of the present disclosure may be implemented in a variety of configurations of information handling system 100-2. As such, the preferred initialization point for method 300 and the order of the steps comprising method 300 may depend on the implementation chosen.

At step 302, at boot or other initiation of information handling system 100-2, BIOS service 216 may create a link aggregation table (e.g., an Advanced Configuration and Power Interface (ACPI) table) with details based on wireless and wired network interface modules present within information handling system 100-2. Creation of details of the link aggregation table may be based on a configuration of the platform of information handling system 100-2 and capabilities of network interface cards present within information handling system 100-2.

At step 304, a container 105 may start up and its OS service 206 may determine the possible link aggregation capabilities of information handling system 100-2 and instantiate virtual link aggregation tables (e.g., ACPI tables) based on a network bandwidth policy of the container 105 upon which the OS service 206 is executing.

At step 306, OS service 206 may communicate a message to OS service 204 to load drivers for container 105.

At step 308, OS service 204 may instantiate an OS driver 214 (e.g., a Linux driver, a Windows Driver Model driver, or other suitable driver) based on operating systems for each of the network instances of link aggregation drivers to be loaded based on dynamic detection of network driver requirements performed by OS services 206 of container 105.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100-2 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
   a processor subsystem; and
   non-transitory computer-readable media communicatively coupled to the processor subsystem and storing instructions, the instructions configured to, when read and executed by the processor subsystem:
   execute a basic/input output service, on the processor subsystem, to create a link aggregation table with details based on wireless and wired network interface modules present within the information handling system, wherein the link aggregation table indicates the wireless and wired network interface modules present within the information handling system;
   execute a guest operating system service on a container instantiated on a hypervisor of the information handling system to perform the following steps:
   instantiate virtual link aggregation tables for the container based on a network bandwidth policy of the container and link aggregation capabilities as set forth in the link aggregation table;
   dynamically detect network driver requirements of network drivers located on the processor subsystem and required by the container; and
   send a message to a hypervisor operating system service executing on the hypervisor to load network drivers for the container based on the network driver requirements;
   in response to receiving the message, execute the hypervisor operating system service to instantiate an operating system driver, in lieu of loading the network driver, for each detected network driver, based on operating systems for network instances of link aggregation drivers and the dynamic detection of network driver requirements determined by the guest operating system service; and wherein the guest operating system and hypervisor operating system are different operating systems.

2. The information handling system of claim 1, wherein the container comprises a virtual machine.

3. The information handling system of claim 1, wherein the container comprises a software application container.

4. The information handling system of claim 1, wherein the container comprises a hardware-rooted, secure container.

5. The information handling system of claim 1, wherein either:
the guest operating system is a Linux operating system and the hypervisor operating system is a Microsoft Windows operating system; or
the guest operating system is a Microsoft Windows operating system and the hypervisor operating system is a Linux operating system.

6. A method comprising:
executing a basic/input output service to create a link aggregation table with details based on wireless and wired network interface modules present within an information handling system, wherein the link aggregation table indicates the wireless and wired network interface modules present within an information handling system;
executing a guest operating system service on a container instantiated on a hypervisor of the information handling system to perform the following steps:
instantiate virtual link aggregation tables for the container based on a network bandwidth policy of the container and link aggregation capabilities as set forth in the link aggregation table;
dynamically detect network driver requirements of network drivers located on the processor subsystem and required by the container; and
send a message to a hypervisor operating system service executing on the hypervisor to load network drivers for the container based on the network driver requirements;
in response to receiving the message, executing the hypervisor operating system service on the hypervisor to instantiate an operating system driver, in lieu of loading the network driver, for each detected network driver, based on operating systems for network instances of link aggregation drivers and the dynamic detection of network driver requirements determined by the guest operating system service; and
wherein the guest operating system and the hypervisor operating system are different operating systems.

7. The method of claim 6, wherein the container comprises a virtual machine.

8. The method of claim 6, wherein the container comprises a software application container.

9. The method of claim 6, wherein the container comprises a hardware-rooted, secure container.

10. The method of claim 6, wherein either:
the guest operating system is a Linux operating system and the hypervisor operating system is a Microsoft Windows operating system; or
the guest operating system is a Microsoft Windows operating system and the hypervisor operating system is a Linux operating system.

11. An article of manufacture comprising:
a non-transitory computer-readable medium; and
computer-executable instructions carried on the computer-readable medium, the instructions readable by a processor, the instructions, when read and executed, for causing the processor to:
execute a basic/input output service to create a link aggregation table with details based on wireless and wired network interface modules present within an information handling system, wherein the link aggregation table indicates the wireless and wired network interface modules present within the information handling system;
execute a guest operating system service on a container instantiated on a hypervisor of the information handling system to perform the following steps:
instantiate virtual link aggregation tables for the container based on a network bandwidth policy of the container and link aggregation capabilities as set forth in the link aggregation table;
dynamically detect network driver requirements of network drivers located on the processor subsystem and required by the container; and
send a message to a hypervisor operating system service executing on the hypervisor to load network drivers for the container based on the network driver requirements;
in response to receiving the message, execute the hypervisor operating system service on the hypervisor to instantiate an operating system driver, in lieu of loading the network driver, for each detected network driver, based on operating systems for network instances of link aggregation drivers and the dynamic detection of network driver requirements determined by the guest operating system service; and
wherein the guest operating system and hypervisor operating system are different operating systems.

12. The article of claim 11, wherein the container comprises a virtual machine.

13. The article of claim 11, wherein the container comprises a software application container.

14. The article of claim 11, wherein the container comprises a hardware-rooted, secure container.

15. The article of claim 11, wherein either:
the guest operating system is a Linux operating system and the hypervisor operating system is a Microsoft Windows operating system; or
the guest operating system is a Microsoft Windows operating system and the hypervisor operating system is a Linux operating system.

* * * * *